Oct. 31, 1967  D. R. ROYER ETAL  3,349,919
TELESCOPING FILTER ASSEMBLY
Filed Sept. 28, 1964  2 Sheets-Sheet 1

INVENTORS
DAVID R. ROYER
JOHN W. BOZEK

ATTORNEYS

Oct. 31, 1967   D. R. ROYER ETAL   3,349,919
TELESCOPING FILTER ASSEMBLY
Filed Sept. 28, 1964   2 Sheets-Sheet 2

INVENTORS
DAVID R. ROYER
JOHN W. BOZEK
ATTORNEYS 3,349,919
TELESCOPING FILTER ASSEMBLY
David R. Royer, Detroit, and John W. Bozek, Waterford, Mich., assignors to The Rosaen Filter Company, Hazel Park, Mich., a corporation of Michigan
Filed Sept. 28, 1964, Ser. No. 399,723
10 Claims. (Cl. 210—232)

The present invention relates to fluid filtering means and more particularly to an improved series type filter assembly.

Series filtering refers to those systems in which a plurality of filter elements of different porosity are connected in series and are arranged to receive the fluid to be filtered in an order of decreasing porosity. Such an arrangement has a greater dirt capacity than a single filter with comparable overall dimensions and porosity. This is true not only because the total filtering area is greater but also because dirt particles are distributed according to their sizes among the several elements. This distribution delays the formation of a dense mat of dirt which offers a high resistance to the passage of the fluid.

It has been the general practice to permanently assemble several elements concentrically within each other so that the assembly can be contained in a single filter housing. The problem with such an arrangement has heretofore been that such a construction prevents the effective cleaning of the filter elements since foreign particles trapped by the innermost filter elements must be back-flushed through the whole series of barriers.

The present invention provides a series type filter assembly in which the filter elements are disposed within each other with a means provided for their separation without disassembly when cleaning is required. With the elements in a separated position, foreign particles dislodged from one element need not be back-flushed through another. The elements remain attached in a unitized assembly during separation so that the filter elements can be cleaned in a single action without the danger of losing parts of the assembly.

It is an object of the present invention to improve series type fluid filtering systems by providing an improved filtering assembly comprising a plurality of individual filter elements arranged within each other so that the complete assembly can be positioned within a single housing.

It is another object of the present invention to improve series type filter assemblies by providing means permitting the filter elements to be separated during cleaning without requiring disassembly and disconnection of the filter elements.

Still further objects and advantages of the present invention will readily occur to one skilled in the art to which the invention pertains upon reference to the following drawings in which like reference characters refer to like parts throughout the several views and in which FIG. 1 is a longitudinal cross-sectional view of a preferred filter assembly of the present invention illustrating the filter assembly in a collapsed, filtering position.

Figure 1:
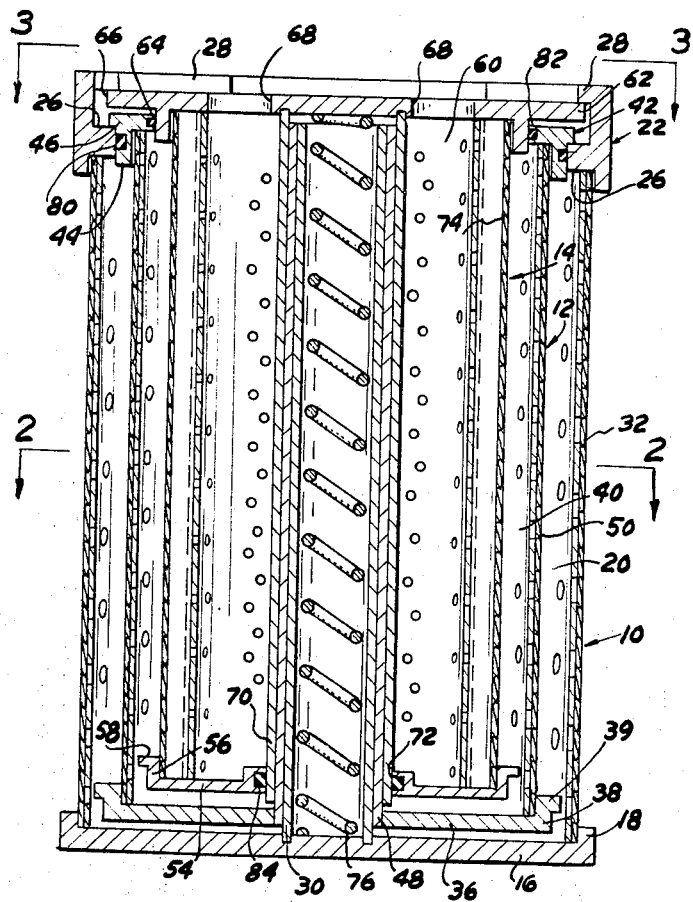
Figure 2:
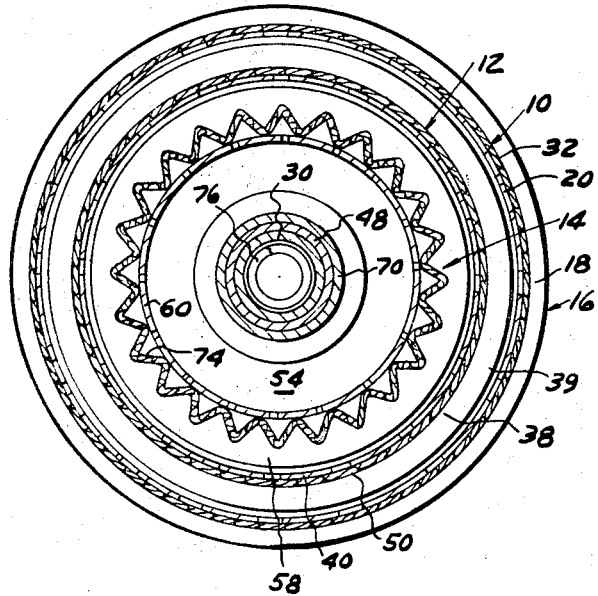
FIG. 2 is a cross-sectional view taken substantially at line 2—2 of FIG. 1.

Now referring to the drawings for a more detailed description of the present invention, a preferred filtering assembly is therein illustrated as comprising a first filter element 10, a second filter element 12, and a third filter element 14 with the elements 10, 12 and 14 constructed to be telescoped one within the other as will be described in greater detail below.

It is to be understood that although it has been preferred to illustrate three filter elements in the assembly of the present invention that any number of such elements can be provided with only slight modifications in the assembly which will be described.

The filter element 10 preferably comprises a disc shaped base portion 16 provided with an axially upwardly extending peripheral flange 18. A cylinderical perforated support member 20 is secured to the inner surface of the flange 18 and is secured at its free annular edge to a flange member 22. The member 22 is provided with an axially extending portion 24 and a radially inwardly extending flange portion 26 which together form the seat for the upper free edge of the support member 20. As can best be seen in FIG. 3, the flange member 22 is provided at its upper edge with a plurality of annularly spaced radially extending arcuate flanges 28. It is to be noted that the flanges 28 extend radially inwardly a shorter distance than the radial flange portion 26. A tubular member 30 extends axially upwardly from the center of the base portion 16. A porous filtering material 32 is carried by the support member 20.

The filter element 12 preferably comprises a disc shaped base portion 36 having an axially extending peripheral flange 38 and a radially outwardly extending flange 39 formed at the free edge of axial flange 38. A cylindrical perforated support member 40 is secured to the annular surface formed by the flange portion 38 and is secured at its upper free edge to a ring member 42. The ring member 42 is provided with an axially extending flange portion 44 overlying and receiving the support member 40 and an annular, radially extending flange portion 46. Base member 36 is provided with a central opening 47 and a tubular member 48 extends through the opening 47 and is secured to the base member 36. The tubular member 48 is dimensioned to receive the tubular member 30 of the filter element 10. Filtering material 50 is carried by the support member 40.

Figure 3:
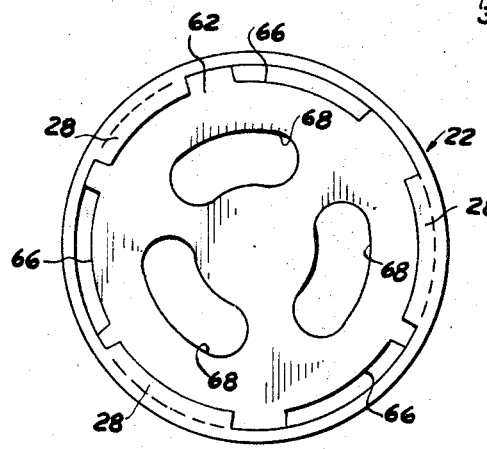
FIG. 3 is an end elevational view as seen substantially from line 3—3 of FIG. 1.

The filter element 14 preferably comprises a base member 54 having an axially extending flange portion 56 formed at the periphery thereof and a flange portion 58 extending radially outwardly from the flange portion 56. A cylindrical, perforated support member 60 is secured to the annular surface formed by the flange portion 56 and is secured at its free edge to a cap member 62. The cap member 62, as can best be seen in FIG. 3, is in the form of a disc having an axially downwardly extending flange portion 64 spaced radially inwardly from the periphery of the cap member 62 to form the seat for the support member 60. The cap member 62, again as can best be seen in FIG. 3, is provided with a plurality of peripheral arcuate slots 66 and a plurality of arcuate openings 68 spaced radially inwardly from the slots 66. A tubular member 70 is secured at its upper edge to the cap member 62 and extends at its lower edge through a central opening 72 provided in the base member 54. The tubular member 70 is dimensioned to receive the tubular member 48 of the filter element 12. A pleated filter material 74 is carried by the support member 60. A spring member 76 is carried in the interior of the tubular members 70, 48, and 30 and is biased between the cap member 62 of filter element 14 and base member 16 of filter element 10.

The filter assembly of the present invention is illustrated in FIG. 1 in a collapsed form. It is in this form in which the filter assembly is intended to be used to filter a fluid. In this position the filter elements 10, 12 and 14 telescopically fit one within the other and fluid flowing radially inwardly through the filter assembly must flow through the filtering materials 32, 50 and 74 of each of the filter elements before passing through the arcuate slots 68 formed in the cap member 62. To produce series type filtration the porosity of the filtering materials 32, 50 and 74 decreases in the direction of fluid flow. In this position the tubular members 30, 48 and 70 are in a collapsed telescoping position against the force of the spring member 76 and the cap member 62 of filter element 14 is disposed closely adjacent the ring member 42 of filter element 12 which is in turn engaging the flange member 22 of filter element 10. To insure that fluid will not bypass any of the filtering elements 10, 12 and 14 an O-ring seal 80 is provided intermediate the engaging surfaces of flange portion 44 of ring member 42 and flange portion 64 of cap member 62. Similarly an O-ring seal 84 is provided intermediate the opening 72 formed in base member 54 and the tubular member 70.

Figure 4:
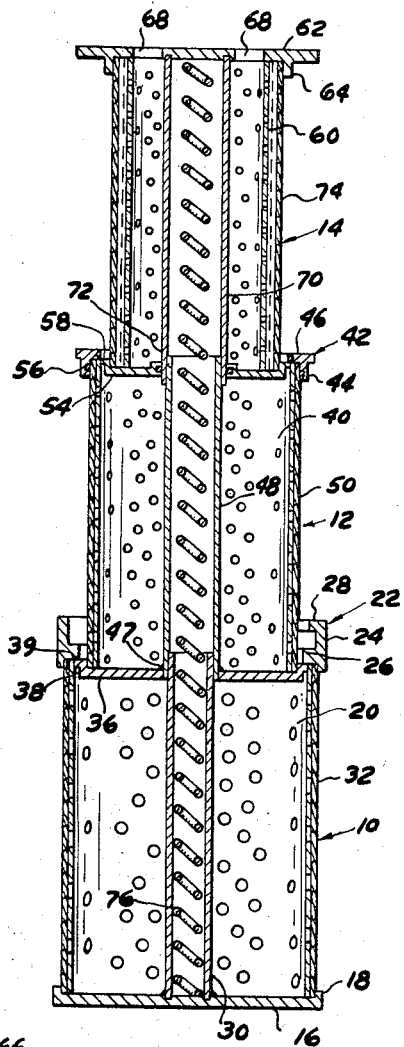
FIG. 4 is a view similar to FIG. 1 but illustrating the preferred filter assembly in an expanded, cleaning position.

The arcuate flanges 28 formed at the upper edge of the flange member 22 lock the assembly in the collapsed position illustrated in FIGS. 1 and 3. When it is desired to to clean the filter assembly the assembly is removed from the filter housing (not shown) in its collapsed position. The cap member 62 and the flange member 22 are then rotated to produce a relative rotation between the filter elements 10 and 12 to bring arcuate flanges 28 into registry with the slots 66 formed in the cap member 62. This permits the cap member 62 to move axially outwardly from the flange member 22 under the action of the spring member 76 toward the expanded or separated position shown in FIG. 4. As the filter element 14 moves axially outwardly, the radial flange 58 of base member 54 will eventually engage flange portion 46 of ring member 42 to separate filter element 12 from filter element 10. This engagement as well as engagement of flange portion 39 of filter element 12 with flange portion 26 of filter element 10 separates the elements while at the same time providing an axial limiting means which prevents the filter elements from becoming disassembled during separation. Cleaning can now be produced by back-flushing through each of the filter elements 10, 12 and 14.

It is to be understood that in the particular embodiment illustrated, the porosity of the filter elements 10, 12 and 14 decreases respectively so that the filter assembly provides a series type filtering arrangement which can be positioned within a single housing. The assembly which has been described facilitates cleaning of the individual filter elements 10, 12 and 14 and since the elements can be separated so that during back-flushing foreign particles trapped by the innermost filter element 14 need not be back-flushed successively through filter elements 12 and 10. Further, separation of the filter elements 10, 12 and 14 does not require disassembly so that parts to the elements cannot become lost or misplaced during cleaning.

It is further apparent that although we have described but a single embodiment of our invention many changes and modifications can be made without departing from the spirit of the invention as expressed by the scope of the appended claims.

We claim:
1. A filter assembly comprising;
 (a) a plurality of filter elements arranged to be positioned one within the other,
 (b) each of said filter elements being provided with a centrally disposed axially extending tubular member, each of said tubular members being of substanitally the same axial length as the axial length of the filter element to which it is fixed,
 (c) said tubular members being dimensioned to telescope one within the other to permit said filter elements to be positioned one within the other,
 (d) means limiting axial separation of said filter elements, and
 (e) a spring member carried within said tubular members and urging said filter elements toward an axially separated position.

2. A filter assembly comprising;
 (a) a plurality of cylindrical filter elements dimensioned to be disposed one within the other in a collapsed position,
 (b) each of said filter elements having means axially slidably engaging another of said filter elements whereby said filter elements may be axially slidably moved from said collapsed position to a separated position,
 (c) said engaging means comprising a tubular member carried by each of said filter elements and disposed to extend axially from a central position within said filter elements,
 (d) said tubular members being dimensioned to be disposed one within the other when said filter elements are in a collapsed position,
 (e) means limiting axial separation of said filter elements, and
 (f) a spring member carried within said tubular members and urging said filter elements toward a separated position.

3. A filter assembly comprising;
 (a) a plurality of cylindrical filter elements dimensioned to be disposed one within the other in a collapsed position,
 (b) each of said filter elements having means axially slidably engaging another of said filter elements whereby said filter elements may be axially slidably moved from said collapsed position to a separated position,
 (c) said last mentioned means comprising each of said cylindrical filter elements being provided with a centrally disposed axially extending tubular member, the tubular members being of a length which corresponds to the axial length of the filter elements and being dimensioned to be disposed one within the other when said filter elements are in said collapsed position,
 (d) means limiting axial separation of said filter elements and means urging said elements toward a separated position.

4. The filter assembly as defined in claim 3 and in which said urging means comprises a spring member carried within said tubular members.

5. The filter assembly as defined in claim 1 and including means selectively operable to lock said filter elements in position one within the other.

6. The filter assembly as defined in claim 5 and in which said limiting means comprises,
 (a) a flange portion provided on each of said filter elements,
 (b) said flange portions of adjacent filter elements engaging at the separated position to thereby limit axial separation of said filter elements.

7. The filter assembly as defined in claim 3 and including means selectively operable to lock said filter elements in said collapsed position.

8. The filter assembly as defined in claim 3 and in which ments in said collapsed position.
(a) each of said filter elements having an upper edge and a lower edge,
(b) a radially inwardly extending flange portion being provided at said upper edge of the outermost of said filter elements,
(c) a radially outwardly extending flange portion being provided at said lower edge of said filter element disposed adjacent said outermost filter element,
(d) said flange portions engaging at said separated position whereby to limit axial separation of said filter elements.

9. The filter assembly as defined in claim 3 and in which said last mentioned means is carried by said tubular members.

10. The filter assembly as defined in claim 3 and including means carried by the outermost of said filter elements and the innermost of said filter elements and being selectively operable to lock said filter elements in said collapsed position.

References Cited

UNITED STATES PATENTS

| | | | |
|---|---|---|---|
| 1,207,776 | 12/1916 | McDonald | 210—338 X |
| 1,515,080 | 11/1924 | Strachan et al. | 210—338 |
| 2,314,048 | 3/1943 | Ladewig | 210—338 X |
| 2,456,025 | 12/1948 | Seifert | 210—134 X |
| 2,982,415 | 5/1961 | Contreras | 210—232 |

FOREIGN PATENTS

| | | |
|---|---|---|
| 168,734 | 9/1921 | Great Britain. |

SAMIH N. ZAHARNA, *Primary Examiner.*

REUBEN FRIEDMAN, *Examiner.*

F. SPEAR, *Assistant Examiner.*